(12) United States Patent
Marinero et al.

(10) Patent No.: US 7,394,730 B2
(45) Date of Patent: **\*Jul. 1, 2008**

(54) APPARATUS FOR PATTERNING RECORDING MEDIA

(75) Inventors: Ernesto E. Marinero, Saratoga, CA (US); Hermantha K. Wickramasinghe, Chappaqua, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,713

(22) Filed: Oct. 19, 2006

(65) Prior Publication Data

US 2007/0036910 A1    Feb. 15, 2007

Related U.S. Application Data

(60) Continuation of application No. 10/609,213, filed on Jun. 27, 2003, now Pat. No. 7,126,885, which is a division of application No. 10/033,903, filed on Jan. 3, 2002, now Pat. No. 6,773,764.

(51) Int. Cl.
*G11B 11/00* (2006.01)
*B05D 5/12* (2006.01)

(52) U.S. Cl. ............... 369/13.14; 369/13.33; 427/128; 427/557

(58) Field of Classification Search ............ 369/13.14, 369/13.33, 13.01, 13.17, 13.02, 13.32, 300; 360/59; 427/128, 557, 130; 216/31, 37; 428/836

See application file for complete search history.

(56) References Cited

U.S. PATENT DOCUMENTS

| | | | | |
|---|---|---|---|---|
| 5,399,372 | A  * | 3/1995 | Grimes et al. | 427/131 |
| 6,024,885 | A  * | 2/2000 | Pendharkar et al. | 216/22 |
| 6,168,845 | B1 * | 1/2001 | Fontana et al. | 428/836 |
| 6,636,460 | B2 * | 10/2003 | Akiyama et al. | 369/13.14 |

* cited by examiner

*Primary Examiner*—Ali Neyzari
(74) *Attorney, Agent, or Firm*—Darren Gold

(57) ABSTRACT

A method for patterning a recording medium selectively thermally couples a recording medium and a heat source to alter a chemical composition of the recording medium. An apparatus for patterning a recording medium has a heat source for generating and directing an incident thermal wave to a recording medium so as to alter a chemical composition of the recording medium, and a controller for coordinating a mutual position of the incident thermal wave and the recording medium for inducing a direct thermal coupling between the recording medium and the heat source.

10 Claims, 5 Drawing Sheets

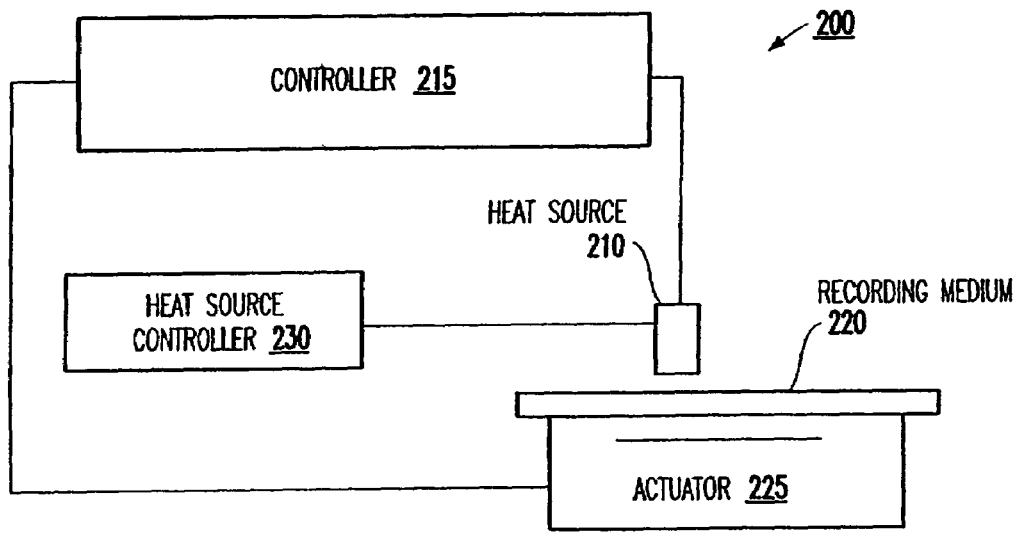
FIG.1
FIG.2A
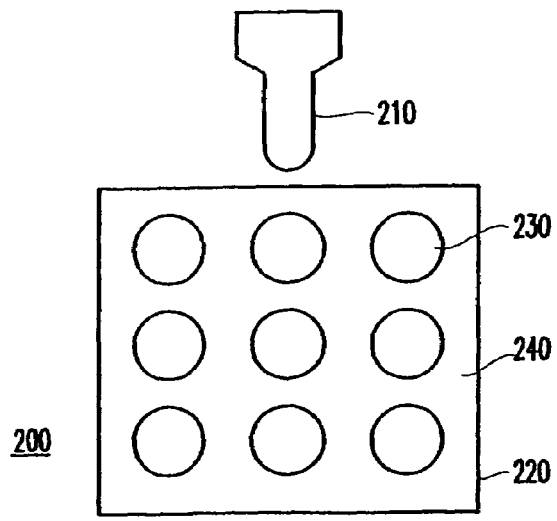
FIG.2B

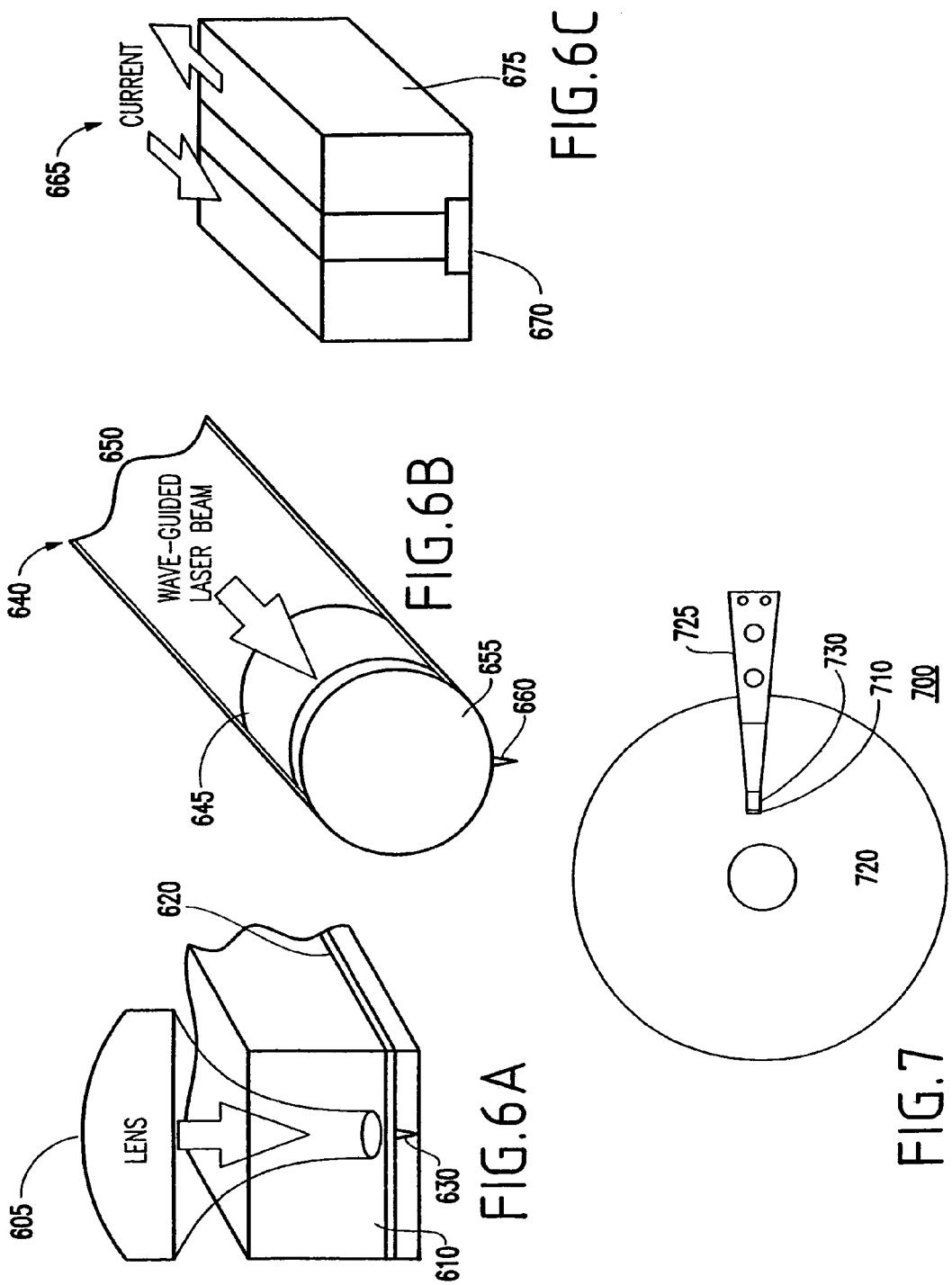

APPARATUS FOR PATTERNING RECORDING MEDIA

REFERENCE TO RELATED APPLICATIONS

This application is a continuation of prior application Ser. No. 10/609,213, filed Jun. 27, 2003, now U.S. Pat. No. 7,126,885 which is a divisional of application Ser. No. 10/033,903, filed Jan. 3, 2002, that issued as U.S. Pat. No. 6,773,764.

BACKGROUND OF THE INVENTION

1. Field of the Invention

The present invention generally relates to patterned recording media and a method of manufacturing the same, and more specifically, to patterned recording media and a method of manufacturing the same using selective thermal coupling.

2. Description of the Related Art

In conventional magnetic recording systems, a written bit size is defined by the dimensions of the recording head. A written domain comprises several hundred magnetic grains. For example, for the highest recording density products being introduced in the market today (20 Gb/in$^2$), the bit cell is about 620 nm×52 nm. To support such areal densities, the microstructure of the recording media has been engineered to consist of non-exchange coupled grains with grain diameters of about 10 nm. Therefore, a recorded domain involves about 400 grains.

Therefore, one approach to achieving higher recording densities is to reduce the bit size and consequently the media grain size. However, this approach is limited because at a critical grain volume, the magnetic grains become thermally unstable and spontaneously switch magnetization direction at normal operating temperatures due to superparamagnetism and are unable to maintain the magnetization orientation imposed on them during the writing process. In addition, as the number of grains is reduced, the noise arising from statistical fluctuations in grain positions or orientation increase.

Another approach to increasing recording density is to modify the microstructure of the media so that a bit is stored in a single grain, or a multiplicity of grains or magnetic clusters which are fully exchange coupled within the recorded bit dimensions. This approach, commonly referred to as "magnetic media patterning" requires that adjacent grains or clusters be magnetically isolated. This approach is perceived as a necessary means for extending magnetic recording to meet storage densities in excess of 100 Gb/in$^2$.

Conventional methods of patterning magnetic media encompass a wide variety of techniques ranging from conventional lithography, to the use of particle and photon sources in combination with masks to produce patterned structures. For example. U.S. Pat. No. 6,168,845 to Fontana et al. (hereinafter "Fontana") discloses a method of making patterned magnetic media using selective oxidation. The Fontana method includes depositing a layer of magnetic material oil a substrate (e.g., a conventional nickel-phosphorus plated aluminum-magnesium substrate), covering portions of the magnetic layer with a protective mask that determines the patterning of the non-magnetic zones, and exposing the protective mask and the uncovered portions of the magnetic layer to an oxygen plasma. The oxygen plasma oxidizes the magnetic layer so that the uncovered portions have a reduced local magnetic moment. The result is a patterned magnetic medium with discrete magnetic and non-magnetic zones.

The utilization of ion beam implantation to achieve patterned media, has been disclosed in "Method for Spatially Modulating Magnetic Properties Using Ion Beam Implantation". J. Baglin. E. E. Marinero and K. Rubin. (AM9-98-096).

Such conventional methods aim to significantly alter the magnetic properties of the regions exposed to the particles, energy sources, ions or reactive species. The areas of the magnetic material which were prevented from exposure by the mask, exhibit different magnetic properties from the exposed areas and information can be recorded and retrieved by taking advantages of the differences in magnetic properties between these two different material regions.

However, these methods have several drawbacks that inhibit their use in magnetic media manufacturing applications. For example, a storage density of over 100 Gb/in$^2$ would require an exposure mask having a feature size of about 40 nm over large areas. In addition, the mask must be accurately aligned and positioned. Further, in the case of particle implantation and reactive ion etching, the mask may have a short lifetime because the impinging species are expected to be heated and deposited on the non-transmissive areas of the mask. In short, these methods generally require additional hardware and/or processing steps which result in higher fabrication costs and longer manufacturing cycle times.

SUMMARY OF THE INVENTION

In view of the foregoing problems of the conventional techniques, an object of the present invention is to provide a structure and method for patterning recording media.

The inventive method includes selectively thermally coupling a recording medium and a heat source to alter a chemical composition of the recording medium. The chemical composition may be altered according to a predetermined pattern, such as concentric circles or parallel tracks.

Further, altering the chemical composition may causes an altered magnetic order of the recording medium, an altered dielectric constant of the recording medium, an altered electrical conductivity of said recording medium, or an altered thermal conductivity of said recording medium. Further, altering the dielectric constant may cause an altered reflectivity of the recording medium. In addition, altering an electrical conductivity may cause an altered electron transport property of the recording medium.

Further, selectively thermally coupling may include selectively directing an incident thermal wave to the recording medium to form a direct thermal coupling between the heat source and the recording medium.

The inventive method may also include depositing the recording medium on a substrate. Further, the medium may include cobalt and chromium, and the substrate may include glass, silicon, quartz, sapphire. AlMg or a ceramic substrate. More specifically, the medium may include $Co_xCr_{1-x}$, where x is in a range from 0.63 to 0.75.

In addition, the heat source may include a near-field thermal probe or a nanoheater. The heat source may or may not physically contact the recording medium.

More specifically, the chemical composition may be altered by one of interfacial mixing, interfacial reactions, selective oxidation, structural relaxation, phase segregation and phase change. In addition, altering the chemical composition may transform the medium from a paramagnetic medium to a ferromagnetic medium, or it may transform the medium from a ferromagnetic medium to a paramagnetic medium.

Further, altering the chemical composition may alter a magnetic axis orientation of the medium or it may reduce magnetization or coercivity of the medium. Furthermore, selectively thermally coupling may include selective near-field radiative coupling of blackbody radiation from the heat source to the recording medium. In addition, thermal energy may be transferred to the medium by conductive heating or by radiative heating.

The present invention also includes an inventive apparatus for patterning a recording medium. The inventive apparatus includes a heat source for generating and directing an incident thermal wave to a recording medium, the thermal wave altering a chemical composition of a recording medium, and a controller for coordinating a mutual position of the incident thermal wave and the recording medium so as to thermally couple the heat source and the recording medium.

Further, the heat source may include, for example, a nanoheater, a near field thermal probe or an atomic force thermal probe. In addition, the heat source may include a heating plate for developing a thermal energy which couples the heat source to the recording medium, and a heat sink connected to the heating plate. The heating plate may include, for example, a tip for concentrating and directing a thermal energy.

The heat source may be heated, for example, by a resistive heating element thermally coupled to the heat sink. Alternatively, the heat source in the inventive apparatus may be heated by using an optical waveguide coupled to the heat sink, for carrying a focused laser beam. The optical waveguide may include, for example, an optical fiber. The optical waveguide may be, for example, a planar optical waveguide.

An especially efficient embodiment of the present invention includes an inventive read/write head assembly, which includes a read/write head, a heat source connected to the read/write head for generating and directing an incident thermal wave to a recording medium, the thermal wave altering a chemical composition of a recording medium, and a controller for coordinating a mutual position of the incident thermal wave and the recording medium so as to thermally couple the heat source and the recording medium. For example, the chemical composition may be altered according to a predetermined pattern, and the heat source may pattern the recording medium during a read/write operation of the read/write head assembly.

The present invention also includes an inventive patterned recording medium which includes a substrate, and a single layer medium formed on the substrate having a portion which has been patterned by altering a chemical composition of the medium using selective thermal coupling.

Furthermore, the present invention includes a method for manufacturing a patterned magnetic disk which includes depositing a recording medium on a substrate, selectively thermally coupling the recording medium and a heat source so as to alter a chemical composition of the recording medium, and depositing a protective coating on the recording medium.

Thus, with the unique and unobvious features of the invention, a simple, versatile method for manufacturing patterned recording media is provided which requires no lithographic masks or additional processing steps. Further, the inventive patterned recording medium is thin and substantially smooth to better facilitate a read/write operation, and an apparatus for patterning recording medium is simple and inexpensive and may be incorporated into a conventional read/write assembly with little alteration of the read/write assembly.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a flow diagram illustrating a method 100 for patterning recording media according to the present invention:

FIGS. 2A-2B illustrate an inventive apparatus 200 for patterning recording media according to the present invention:

FIGS. 6A-6C illustrates alternative structures for heating a near field thermal probe that may be used as a heat source according to the present invention:

FIG. 7 illustrates a recording media patterning apparatus 700 incorporated into a read/write head assembly for patterning a recording media according to the present invention.

DETAILED DESCRIPTION OF PREFERRED EMBODIMENTS OF THE INVENTION

Figure 3:
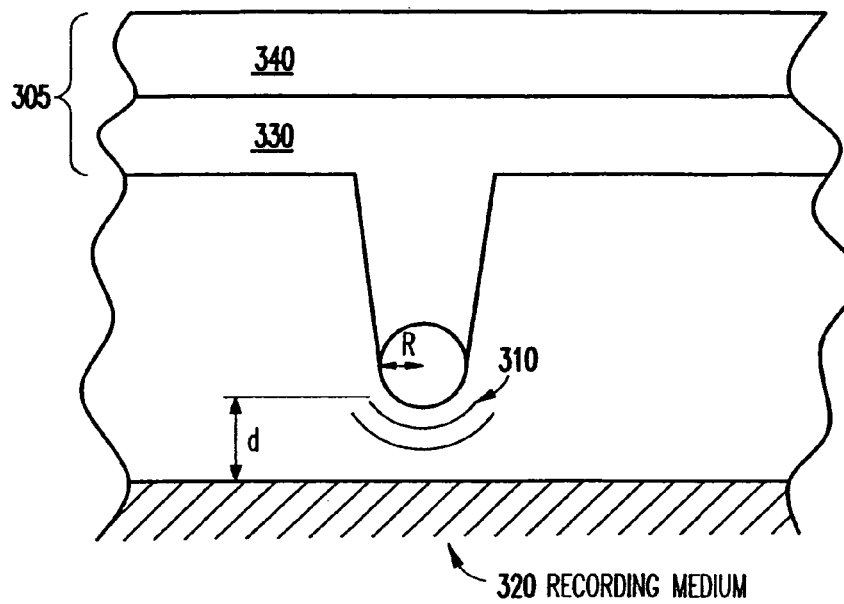
FIG. 3 illustrates a near-field thermal probe that may be used as a heat source in a method 100 for patterning recording media according to the present invention.

Referring now to the drawings. FIG. 1 is a flowchart illustrating a method 100 of manufacturing patterned recording media according to the present invention.

The inventive method 100 achieves nanoscale material alterations in the chemical composition of a recording medium by selectively thermally coupling the recording medium to a heat source. These thermally-induced alterations in chemical composition may include, for example, interfacial mixing, selective oxidation, structural relaxation, interface chemical reactions, magnetic relaxation, phase segregation and phase transformations. Such transformations result in significant changes in magnetic properties of the areas exposed to the thermal pulse. The inventive method, therefore, provides a simple, versatile technique for manufacturing patterned recording media which requires no lithographic masks or additional processing steps.

Further, altering the chemical composition may cause the subjected areas of the recording medium to have, for example, an altered magnetic order (e.g., altered magnetic axis orientation, magnetization or coercivity), an altered dielectric constant, an altered electrical conductivity or an altered thermal conductivity. Further, the altered dielectric constant may cause an altered reflectivity of the recording medium. In addition, the altered electrical conductivity may cause an altered electron transport property of the recording medium.

For example, altering the chemical composition may transform an initially (i.e., before thermal coupling) paramagnetic medium to a ferromagnetic medium. Similarly, altering the chemical composition may transform an initially ferromagnetic medium to a paramagnetic medium.

In other words, unlike conventional methods which treat a magnetic medium to reduce its magnetic properties, the inventive method 100 does not require that the medium be initially magnetic. Instead, the inventive method uses a medium having a chemical composition that is alterable by selective thermal coupling. The areas of the medium in which the chemical composition has been altered by selective thermal coupling may be made to have higher magnetic properties than areas in which the chemical composition has not been altered, or lower magnetic properties than areas in which the chemical composition has not been altered.

The inventive method 100 may also include depositing the recording medium on a substrate. Generally, the substrate can be any conventional substrate on which a recording medium can be deposited, such as glass, silicon, quartz, sapphire. ALMg, or a ceramic material. One common conventional substrate which may be used is aluminum-magnesium alloy substrate coated with a nickel-phosphorus layer. Furthermore, in the inventive method 100, the recording medium may be deposited on the substrate by any conventional means. For example, the medium may be deposited by sputtering, ion beam deposition or thermal deposition.

Further, the recording medium may include conventional materials. For example, conventional magnetic materials such as nickel, cobalt or iron alloys may be deposited. The medium may also include, for example, $BaTiO_3$, $T_c=120°$ C.), $PbTiO_3$ ($T_c=490°$ C.), lead iron niobate ($T_c=112°$ C.), tri-glycine sulphate ($T_c=49°$ C.), or $NaKC_4H_4O_6.4H_2O$, etc. However, as noted above, the inventive method 100 does not require that the medium be magnetic, but merely that the medium have a chemical composition alterable by selective thermal coupling.

In addition, although conventional substrates and media may be used, the inventors have discovered that non-conventional materials may be used with better results than those derived from conventional materials. For example, the inventive method may use a substrate of glass or aluminum-magnesium alloy coated with carbon. Further, a non-conventional recording medium may include a cobalt chromium compound. Specifically, the medium may include $Co_xCr_{1-x}$, where x is in a range from 0.63 to 0.75. For instance, $Co_{63}Cr_{37}$ may be used. Note that $Co_{63}Cr_{37}$ is paramagnetic but can be thermally transformed to a ferromagnetic material.

Other characteristics of the substrate and recording medium may vary depending on the types of materials used. Generally, the substrate should be rigid and substantially heat resistant. The recording medium should have a thickness in a range of about 1.0 to 500 nm and have a chemical composition that is alterable by selective thermal coupling.

Referring again to FIG. 1, the inventive method 100 selectively thermally couples (110) the recording medium to the heat source so as to alter the chemical composition of the medium. Specifically, an incident thermal wave is directed from the heat source to the recording medium to form a thermal coupling between the heat source and the recording medium. The recording medium may be selectively thermally coupled so as to form areas of medium having an altered chemical composition, and areas of medium where the chemical composition is unchanged by the thermal coupling. In other words, the medium may be selectively thermally coupled to the heat source according, for example, to a pattern (e.g., a predetermined pattern such as concentric circles (e.g., on a disk-shaped recording medium) or parallel tracks (e.g., on a magnetic tape)) so as to "pattern" the medium. Further, the heat source may or may not physically contact the recording medium, so long as thermal coupling is attained between the heat source and the recording medium.

As mentioned above, the interaction of a heat source with the recording medium induces a localized temperature rise that leads to an altered chemical composition in the area of the recording medium which is subject to the thermal coupling. Such thermally-induced transformations may include, for instance, interfacial mixing. For instance, the structure of conventional recording media may consist of a plurality of layers with different functionalities. Domains are typically recorded on either a single magnetic layer or in a multilayer stack (the storage layer) within this plurality of layers. At elevated temperatures, interfacial mixing between the storage layer and the other ancillary layers or within the ultra-thin layers of a multi-layer storage layer, leads to stoichiometric changes, nearest neighbor distance changes that alter the magnetocrystalline anisotropy, the magnetization and coercivity of the storage layer.

Such thermally-induced transformations may also include interfacial reactions. Localized heating can also result in the formation of new chemical species as the storage layer constituents react with the atomic species of the ancillary top and bottom layers or within the ultra-thin layers of the multilayer storage layer. Once more, the effect is to alter the stoichiometry of the storage layer which may result, for example, in changes in magnetic properties of the recording medium.

Another thermally-induced transformation may include oxidation. The temperature rise induced by the heat source can permit the efficient oxidation of the storage layer in a reducing atmosphere. This is favored in structures for recording, because the magnetic layers and underlayers such as a carbon overcoat are ultra thin (e.g. typically within a range of about 1 to 10 nm) The diffusion length of oxygen at temperatures over 200° C. permits the rapid diffusion of atmospheric oxygen, for example, through the carbon overcoat. Upon reaching the storage layer, oxidation will proceed from the most reactive atomic constituent to the most noble one. The extent of the oxidation is controlled by the temperature rise, the pulse duration and both the overcoat and the storage layer thickness.

For example, oxidation may result in dramatic changes in magnetic properties of the storage layer. The inventors have conducted experiments in which oxidation transformation was observed. In these experiments, paramagnetic layers of $Co_{63}Cr_{37}$ were directly deposited on glass and aluminum-magnesium substrates and overcoated with 4 nm thick carbon overcoats. The samples were then annealed utilizing a rapid thermal annealing apparatus in an oxygen containing atmosphere. Comparative studies were also done in a nitrogen atmosphere. Prior to annealing, it was confirmed by magnetometry that the thin films were paramagnetic. Annealing in the oxygen containing atmosphere produced a ferromagnetic material with out-of-plane magnetic anisotropy. In contrast, annealing in a nitrogen environment resulted only in a very weak magnetic response. For example, in the case of $Co_{63}Cr_{37}$, chromium has the highest chemical affinity to oxygen and, therefore, preferential chromium oxidation occurs upon exposure of the film to oxygen. Consequently, by selectively thermally coupling a medium including $Co_{63}Cr_{37}$ according to the inventive method, a film structure can be produced which includes magnetic islands imbedded in a paramagnetic matrix.

To avoid lateral heat spread and therefore a loss in spatial resolution, the film is preferably thin (e.g., less than about 10 nm) and deposited on underlayers with higher thermal conductivity than the recording film. Orientation of the magnetic axis is achieved by rowing the paramagnetic thin film on a suitable underlayer which places the basal plane of the hexagonal-closely-packed (HCP) unit cell either parallel (i.e., perpendicular recording) or orthogonal (i.e., longitudinal recording) to the film plane.

Another thermally-induced transformation may include magnetic relaxation. The coercivity and anisotropy in magnetic amorphous materials strongly depend on the local order, i.e., the internal stress and the local environment. Annealing above the effective growth temperature leads to relaxation effects of the local order and internal stress resulting in changes in magnetic properties. This is generally known as magnetic relaxation. For example, in the case of TbFeCo ferromagnetic materials, the inventors have shown that nanosecond laser annealing causes the magnetic axis orientation to flip from the out-of-plane to an in-plane geometry. At higher laser powers (i.e., higher annealing temperatures) the inventors discovered that the ferromagnetic response of the irradiated area was lost and the material became paramagnetic.

Another thermally-induced transformation may include phase segregation and phase transformation. Changes in crystalline phases or the segregation of a secondary phase induced by selective thermal coupling also cause profound changes in magnetic properties. This can include magnetic anisotropy losses, saturation, remanent moment decrements, and formation of a paramagnetic phase. The heat source can also be effective in achieving such phase changes in nanoscale dimensions and hence enabling media patterning based on such physical changes.

More specifically, the inventive method 100 selectively thermally couples the recording medium to a heat source so as to alter a chemical composition of the recording medium on a microscopic scale. Generally, the inventive method 100 accomplishes this by positioning a very small heat source very close to the recording medium. The selective thermal coupling (110) may, therefore, be limited to an area very near the heat source and the recording medium can be effectively patterned by repositioning the heat source according to the desired pattern.

Furthermore, as shown in FIG. 2A, the present invention may also include a media patterning apparatus 200. The inventive apparatus 200 may include a heat source 210 for generating and directing an incident thermal wave to the recording medium 220, so as to alter the chemical composition of the recording medium 220. The heat source 210 may include, for example, a nanoheater, near-field thermal probe, an atomic force microscope probe, or other structure for generating and directing a thermal wave at the recording medium 220.

The inventive media patterning apparatus 200 may also include, for example, a controller 215 for coordinating mutual positioning of the incident thermal wave generated by the heat source 210 and the recording medium 220 so as to thermally couple the heat source 210 and the recording medium 220. A suitable such controller 215 may include an actuator 225 which may include, for example, a piezo-electric actuator, an electro-static actuator, an electro-magnetic actuator, a magnetic-strictive actuator, or a thermal-mechanical actuator The inventive recording media patterning apparatus 200 may also include a heat source controller 230 for enabling heat source control. In order to control the patterning process, the heat source 210 should be controlled precisely. The heating may be controlled, for example, by modulating a laser (e.g. liquid crystal, Bragg cell, current modulation etc.) if a laser is used, or by simply modulating the supplied current if resistive heating is implemented.

As explained above, the media patterning apparatus 200 may utilize a heat source 210 to achieve nanoscale material transformations (i.e., interfacial mixing, etc.) in a recording medium 220 by selectively thermally coupling the recording medium 220 to the heat source 210. The thermally coupled areas may thereby be made to have altered chemical compositions resulting in higher or lower magnetic properties than areas that were not subjected to thermal coupling. The inventive apparatus 200, therefore, provides a simple, versatile technique for manufacturing patterned recording media which requires no lithographic masks or additional processing steps.

More specifically, as shown in FIG. 2B, the heat source 210 generates and directs an incident thermal wave to the recording medium 220. To form the thermal coupling, the heat source 210 should be in close proximity to the recording medium 220 (e.g., a distance of less than about 20 nm). As noted above, the selective thermal coupling of the recording medium 220 is isolated to those areas near the heat source 210. For example, the temperature of the heat source 210 may be typically greater than 75 degrees C. for a duration of less than 1 second.

As explained above, the selective thermal coupling results in areas of the recording medium 220 having an altered chemical composition (i.e., altered areas) 230, and areas of the recording medium 220 in which the chemical composition is unaltered (i.e., unaltered areas) 240. Note that, as shown in FIG. 2B, the heat source 210 may have a circular profile which would result in a circular profile of the altered areas 230, or the heater 210 may have a profile other than circular which would affect the profile of the altered areas 230 accordingly.

Further, as noted above, the heat source 210 used to generate and direct an incident thermal wave to the recording medium 220 may include, for example, a nanoheater. In this case, the tip of the nanoheater should be positioned, for example, at a distance less than about 20 nm from the recording medium. Thermal energy may be transferred from the nanoheater to the recording medium 220, for example, by conductive heating (i.e., diffusion of energy due to random molecular motion). Further, the heat source 210 may transfer thermal energy to the recording medium 220 by radiative heating.

In addition, as shown in FIG. 3, the heat source in the inventive apparatus 200 may include a near field thermal probe 305 for generating and directing the thermal wave to the recording medium. As shown in FIG. 3, a suitable near-field thermal probe 305 may include, for example, a heating plate 330 for directing thermal energy at the recording medium 320, and a heat sink 340 which is attached to the heating plate 330. The probe 305 is capable of developing a thermal near-field coupling with the recording medium 320. Further, as shown in FIG. 2A, when the heat source 210 includes a near field thermal probe 305, the controller 215 functions so that the coupling subsumes at least one portion of the thermal near-field.

As shown in FIG. 3, the near field thermal probe 305 having a tip 310 interacts via its thermal near-field with a recording medium 320. The tip 310 may be, for example, spherical having a radius R as shown in FIG. 3. For purposes of the present invention, the thermal near-field region is the area generally within approximately 2 R away from the tip 310. The rest of the area on the surface of the recording medium 320 is generally considered far-field. Therefore, thermal energy may be transferred from the near field thermal probe 305 to the recording medium 320 via selective near-field radiative coupling of blackbody radiation from the probe 305 to the recording medium 320.

In the near-field region of the recording medium 320, the extent of the thermal energy is generally governed by the tip 310 dimensions. Therefore, if the tip 310 is brought within approximately 2 R (i.e., two times the radius of the tip of the near-field thermal probe) of the recording medium 320, very local, nanoscale heating of the recording medium 320 can be achieved. A heated area of the recording medium 320 can thereby be determined by the tip 310 dimensions.

In this particular application of heat flow, in the far-field the heat is transferred via diffusion as well as via radiation according to the Stefan-Boltzmann law. In the near-field, a ballistic heat flow, where a gas molecule picks up some energy form the heater and transfers it without collisions to the media as well as heat conduction via non-propagating waves, are important. It is also noted that contamination layers on the surface may contribute significant heat flow as well as intermittent contact between the heat source and the medium.

More particularly, thermal energy may be transferred to the near field thermal probe 305 using, for example, a resistive element which is thermally coupled to the heat sink 340. Alternatively, the inventive apparatus 200 may include an optical waveguide which is coupled to the heat sink 340 for carrying a focused laser beam. The optical waveguide may include, for example, a planar optical waveguide. The optical waveguide may include an optical fiber.

Attention is now directed to FIGS. 4A-D, which help illustrate the many different geometrical, dimensional, and material configurations which may be suitably adapted for a particular realization of the near-field thermal probe.

In overview of the near-field thermal probes of FIGS. 4A-D, it is noted that their purpose is to transfer heat energy to the recording medium 320. This energy can be almost any kind: e.g., coherent or non-coherent excitons, plasmons, phonons, photons, etc., and it can be delivered in any mode (e.g., convective, radiative, or conductive transfer) from the heat source to the medium 320. The heat transfer (see J. B. Xu. K. L-uger. R. M-ller. K Dransfeld. I. H. Wilsom. J. Appl. Phys., 76, 7209 (1994)) is generally diffusive if the mean free path of molecules $\lambda$ is much less than the distance of the heater to media, d. However, if d<$\lambda$, the molecules in the junction go from the heat source to the medium without collisions, and transfer the heat in a ballistic manner. In addition, in the far-field heat can be transferred via propagating radiation according to the Stefan-Boltzmann law. Furthermore, non-propagating waves (near-field) are capable of transferring the heat via a tunneling process when heat source and medium are very close to each other (near-field region). From a physics point of view, the charges within the near-field thermal probe are thermally excited, which generate a significant driving field of the thermal probe. This driving field generates, consequently, a near-field of the probe, which couples to the recording medium 320, and thus heats the recording medium 320. It is noted that this effect can be maximized by using a resistive conductor (such as carbon). In addition, this effect can be enhanced by implementing an elongated shape as well as a very small end radius of the probe. Good geometrical conductors for the thermal probe may include rectangular or cylindrical design, of the type shown in FIGS. 4A and 4B, respectively.

For example, the preferred dimensions of $y_1$ and $z_1$ (FIG. 4A) or $r_1$ (FIG. 4B) are informed by the way the thermal energy is to be deposited. For instance, if one uses a focused laser beam to heat up the heating plate 410, 415, $y_1$ and $z_1$ or $r_1$ preferably are larger than the waist of the laser focus (e.g., for a numerical aperture of 0.8 $y_1$, $z_1$, $r_1$ greater than 0.8 micrometer). If, on the other hand, one uses a wave-guided laser beam, then the heating plate 410, 415 preferably is attached right onto the end of a fiber (e.g., via vapor deposition). Therefore, the heating plate 415 preferably has a cylindrical shape, and $r_1$ is determined by the wave-guide size. More specifically, for a single mode fiber in the visible wavelength range, $r_1$ preferably is approximately 3-4 micrometer. If one uses tapered fiber, $r_1$ preferably is larger than or equal $\lambda \approx /2$, where $\lambda$ is the wavelength of the utilized laser light. If, alternatively, one uses resistive heating, then one chooses, most likely, a rectangular shape, and the dimensions are preferably dominated by the connections and the resulting resistance.

In the case of resistive heating, these dimensions can be rather small (e.g., $y_1$, $z_1$ less than 0.1 micrometer) if they are made via e-beam lithography. Further, in the case of resistive heating, the dimensions as well as the material determine the actual resistance, and hence the heating.

While the $y_1$, $z_1$, $r_1$ dimensions are determined mostly by practical needs, the thickness of the heating plate 410, 415 itself should be rather small (e.g., $d_1$, $x_1$ less than 0.5 micrometer), for example, if the device is to be used for high speed patterning. More specifically, in high speed applications, one preferably uses energy pulses to deposit the heat in the heating plate, so as to subsequently heat up the near-field heat source, e.g., a tip or an edge of the heating plate.

In addition, in order to heat up again, the deposited heat (e.g., from a last pulse), has to be dissipated. This dissipation is (governed by the thermal diffusion length $l=(\kappa \cdot \tau)^{0.5}$, where $\kappa$ is the thermal diffusivity and $\tau$ is the time after the arrival of a heat pulse. Specifically, the heat in a good thermal conductor (approximately $K=2 \cdot 10^{-5}$ m$^2$s$^{-1}$) can diffuse a distance of 0.45 micrometer in only 10 ns, corresponding to recording rates of 100 MHz. If one uses a laser beam to deposit the heat, it is noted that the heating plate 410, 415 preferably should at least have a thickness of the skin depth at the laser frequency. Specifically, for a very high absorbing material (e.g., Al) it preferably is larger than 10 nm at 633 nm.

The heating plate 410, 415 can be made out of any material, but in general the following requirements preferably exist: (1) the material preferably has a high melting point (T>1100K), generally higher than the temperature necessary to thermally anneal the medium 320 and therefore, pattern the medium 320; (2) the material preferably has a high thermal diffusivity (K>$1 \cdot 10^{-5}$ m$^2$ s$^{-1}$, e.g., metals and alloys); (3) the material preferably is high absorbing if a laser is used for the heating (e.g., Cr, Al).; (4) if the heating plate operates as the heat source, a resistive conductor may be preferred, especially in order to maximize the heat transfer from the heat source to the recording medium 320 via near-field coupling.

Figure 4A:
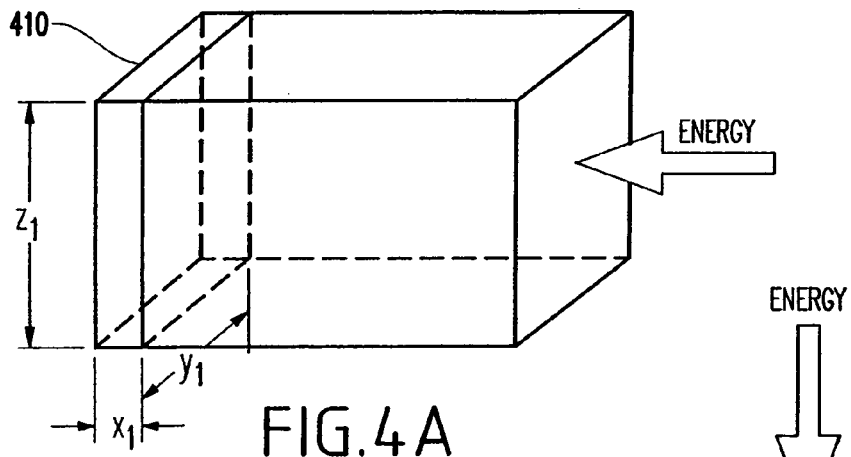
FIGS. 4A-4D illustrate alternative structures of a heating plate of a near-field thermal probe that may be used as a heat source according to the present invention.
Figure 4B:
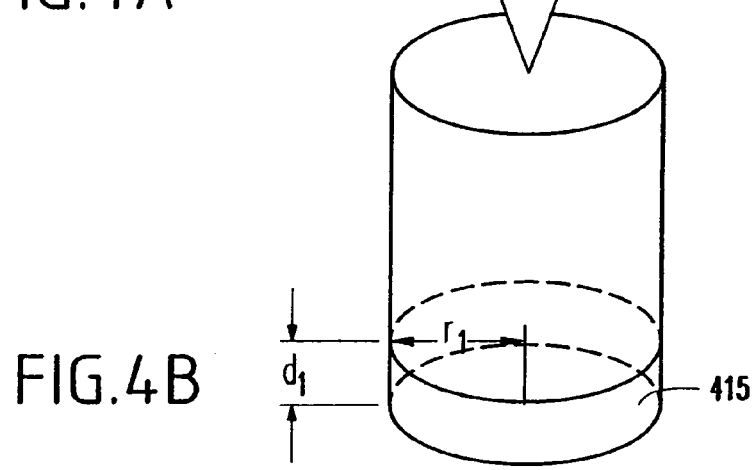
Figure 4C:
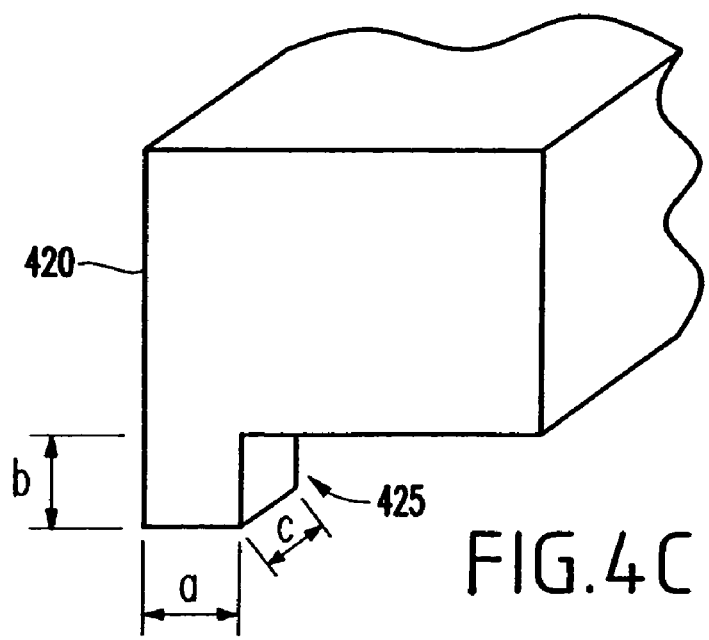
Figure 4D:
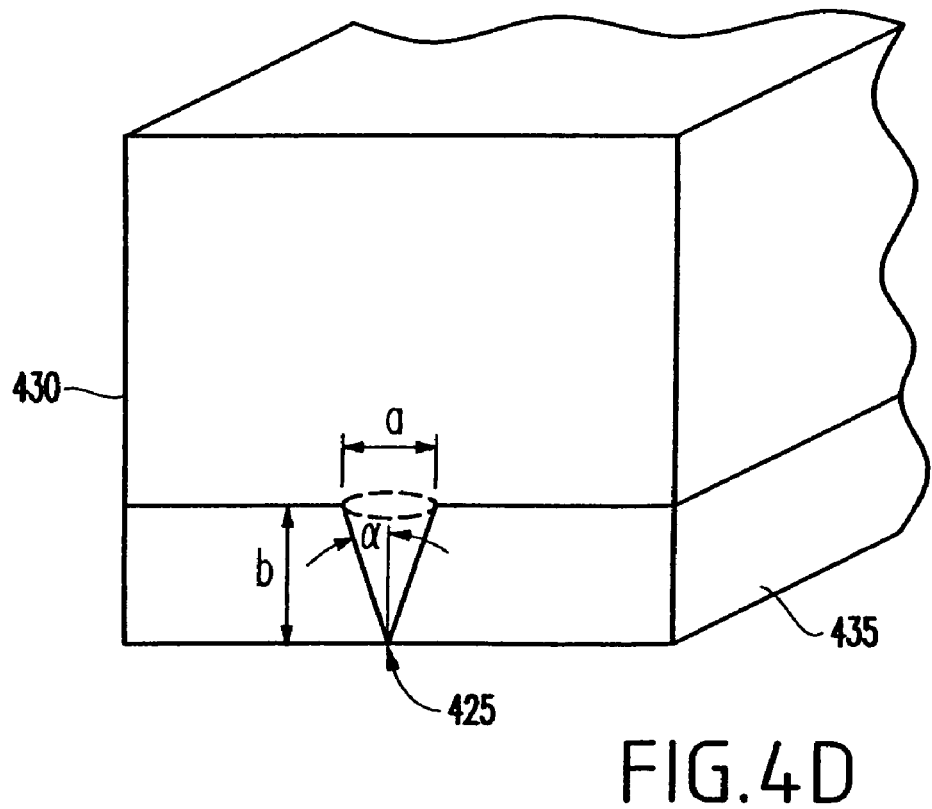

As explained above, a generic purpose of the heat plate operating as a heat source is to guide the thermal energy to the medium 320. It should be noted that if unrestricted, the heating plate is capable of thermally annealing the medium. Therefore, the heat source must be controlled to avoid general heating from the heating plate, and to instead focus the thermal energy to a very small point. An attendant and novel property is then to generate a thermal near-field, which can interact very locally, preferably on a nanometer scale, with the medium. To this end, the heating plate operating as a heat source can have all kinds of shapes and dimensions. For example, as shown in FIG. 4C, the heat source 425 may be just an edge of a heating plate 420 or, as shown in FIG. 4D, the heat source 425 may be a truncated cone of a heating plate 430. Further, as shown in FIG. 4D, the heat source may be protected by some low heat conducting material 435 (e.g., glass). Further, an edge or tip material is preferably governed by the same general material requirements as that of the heating plate itself.

Overall, the shape and dimensions of the heating plate operating as a heat source are influenced by the following requirements. First, for high speed application, a designer preferably chooses a shape and dimensions which transfer the heat as fast as possible. Thus, a heat source preferably should have a small length b (e.g., b less than 0.5 micrometer), in order to achieve sufficient heat dissipation within its thermal diffusion length. If one just considers high speed applications, one may be tempted to choose large dimensions of a and c, as shown in FIG. 4C, and a and b, as shown in FIG. 4D, in order to avoid a slow one-dimensional heat conduction.

Secondly, however, besides high speed, a heat source preferably provides a very local heating, avoiding any stray heat from the heating plate, generally. Accordingly, this correlates with opposite requirements for the dimensions. Therefore, as shown in FIG. 4C, for a very local heating, b should preferably be large (e.g., more than 0.1 micrometer), and the dimensions a and c should be small (e.g., less than 0.01 micrometer), and as shown in FIG. 4D, dimensions a and α should be small (e.g., a less than 0.1 micrometer, and α less than 15'). It should be noted that power loss increases with decreasing dimensions in a, c (in FIG. 4C) and a, α (in FIG. 4D), which may result in insufficient and very ineffective heating.

Thirdly, the shape and dimensions of the heat source are preferably matched to a bit size and a bit pattern. In general, the bits are typically larger or equal to the dimensions of a heat source. For example, as showing in FIG. 4C, for a 20 nm bit, a heat source should preferably have the dimensions a, c which are much smaller than 20 nm.

Fourth, in order to maximize the thermal near-field coupling (as outlined above), an elongated shape with a sharp tip-like point may be preferred.

Figure 5A:
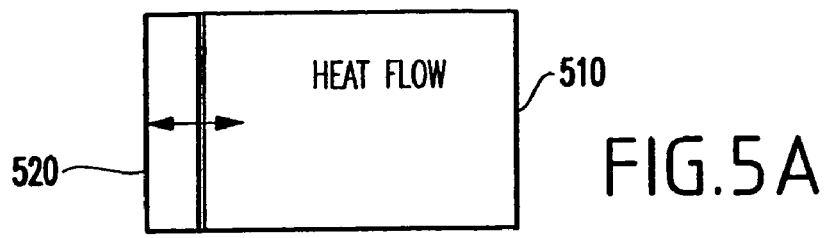
FIGS. 5A-5C illustrates alternative structures of a heat sink of a near-field thermal probe that may be used as a heat source according to the present invention.

Furthermore, as mentioned above, in addition to the heating plate, the near-field thermal probe includes a second element, namely, a heat sink attached to the heating plate. An important purpose of the heat sink is to dissipate deposited heat as fast as possible in order to get ready for a new heating pulse. Therefore, as shown in FIG. 5A, the heat sink is preferably attached to the heating plate in such a way that the heat conduction between heat sink 510 and heating plate 520 is as good as possible (K>1·10$^{-5}$ m$^2$s$^{-1}$). Therefore, it may be very advantageous if the heat sink and the heating plate are made out of the same material. In other cases, the heat sink may be welded, glued, or deposited (via e-beam, vapor, sputtering etc.) right on the heating plate.

Figure 5B:
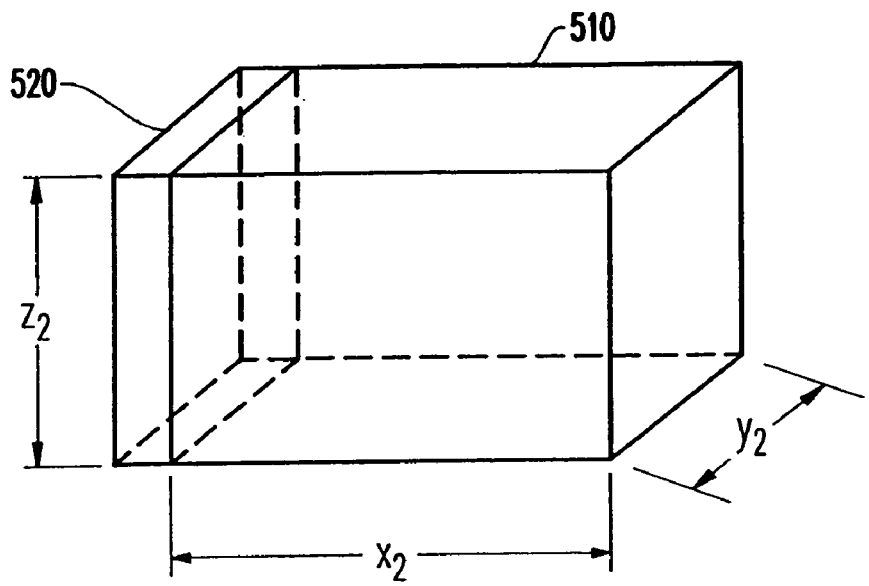
Figure 5C:
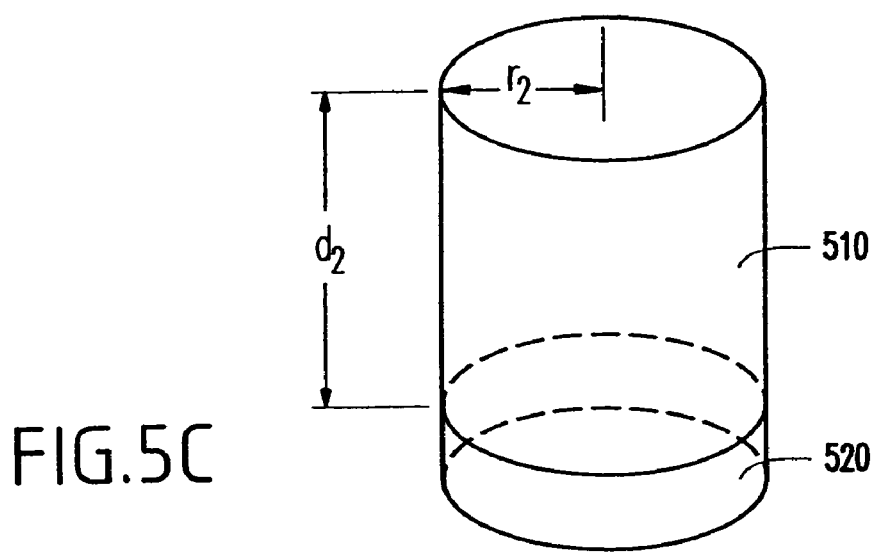

Dimensions and shapes for the heat sink are not very critical (in fact, the heat sink may be integrally formed with the heat plate). Therefore, only guidelines can be given here. In general the heat sink can have all kinds of shapes. However, as shown in FIGS. 5B and 5C, in typical cases, it may be rectangular or cylindrical. To provide a sufficient heat sink mass, the heat sink may be very large. Large dimensions (e.g. more than 1 micrometer) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length l for a given heating repetition rate 1\t (where t is time in seconds). The material of the heat source can be almost any kind. In analogy to the heating plate and the heat tip or edge, the material of the heat sink preferably has a high melting point as well as a high heat conductivity. However, in some cases the material should not be high absorbing at the laser wavelength, for example, if the laser has to be focused on the heating plate through the heat sink material. In such case, a transparent material (e.g., diamond) should preferably be used, which is still a good heat conductor and has a high melting point.

As mentioned above, the near-field thermal probe uses the idea of direct thermal coupling between a heat source and a medium, and that this coupling can subsume far-field and/or near-field effects. In particular, near-field effects may include a continuum that may extend from coupling that subsumes at least one portion of the thermal near-field: ranging e.g., from partially inclusive, to substantially or even complete coupling in the thermal near-field.

Furthermore, as shown in FIGS. 6A-C, there are different ways of supplying thermal energy to (i.e., heating) the near field thermal probe. For instance, FIG. 6A shows a focused laser beam embodiment, wherein a focused laser beam 605 is brought through a heat sink 610 onto a heating plate 620. In this case, the heat sink material may be, for example, diamond which is transparent and has an excellent heat conductivity. An alternative material could be Si, for example, if an infrared laser is used. The heating plate 620 can be very thin (e.g., about 0.1 micrometer) if a high absorbing material is used (e.g., Al, Cr,). Directly attached to the heating plate 620 is a heat tip or feature 630, which preferably is short (e.g., less than about 0.3 micrometer). The material of the heat tip or feature 630 may be, for example, Cr or At. Further, the heat tip or feature 630 may be protected with a low heat conducting material, such as glass.

FIG. 6B shows an alternative embodiment comprising a wave-guided laser beam 640 used for the heating. In this embodiment, a heat sink 645, which may be made, for example, out of diamond, may be directly attached to the end of a fiber 650. In other cases, a metal coating (e.g., Al) of the wave-guide can be used as the heat sink. The wave-guide laser beam 640 is absorbed by a thin (e.g., less than 0.1 micrometer) heating plate 655 directly attached to the fiber or heat sink. A material such as Cr or Al may be advantageous, because they have generally a small penetration depth (e.g., less than 0.02 micrometer). A heat source or tip 660 can be, for example, aluminum and form an edge or a little probe attached to the heating plate 655. In such a design, the heat source or tip may have a length, for example, of less than about 0.3 micrometers.

FIG. 6C shows a further alternative embodiment wherein resistive heat 665 may be used to heat a heating plate 670. In addition, the transmission lines could be formed of a metal such as Cu and used as a heat sink 675. The two transmission lines are separated by a non-conducting material, for example, diamond or glass. Diamond has an advantage, in that it is a very good heat conductor, and can assist the heat sink 675. The two transmission lines are connected via the heating plate 670, which can act as a heating source. The heating plate 670 can be very small (e.g., less than 0.05 micrometer). As a material for heating plate and the heat source, tungsten or carbon may be very suitable, because of its resistance and high melting point.

In addition, as mentioned above, the near-field thermal probe may be, for example, an atomic force microscope probe (AFM). AFMs are generally discussed in U.S. Pat. No. 4,343, 993, incorporated by reference herein. For purposes of the present invention, the AFM's cantilever can function as a heating plate and heat sink. Thus, a laser focused onto the cantilever (heating plate) can be used to heat up the probe. An AFM probe can also be heated by resistive heating.

Hence, the inventors found that local heating of a medium may be achieved by bringing a heated element in close proximity, for example, within about 10 to 20 nm of a medium surface. For small coupling gaps in the 10 to 20 nm range, the dominant mechanism of heat transfer is due to near-field radiative coupling of the blackbody radiation from the heat source to the medium surface. Experiments have shown, that for a silicon heater, heated to 600 C. a medium on a glass disk can be heated to 200 C. at a gap spacing of around 5 nm and over a spatial region of 15 nm×15 nm. The typical power flow over this area is on the order of 3 microwatts. The transfer efficiency can be further improved by optimizing the resistivity of the heater and the effective resistivity of the medium surface (which may include a carbon overcoat). The resistivity should be chosen to be around 10-30 ohm-m or $(4\pi k BT-0)/h$.

Second Embodiment

In addition, as shown in FIG. 7, in an especially efficient embodiment, an inventive apparatus 700 for patterning a recording medium according to the present invention may be incorporated into a read/write head assembly 725 so that patterning can be readily performed during an operation of the read/write head assembly 725 such as, for example, during a file formatting operation. For instance, in this embodiment, the heat source 710 (e.g., a nanoheater, near-field thermal probe, or atomic force microscope probe) may be mounted with the slider 730 on the read/write assembly 725. This greatly simplifies the precision that would be required to locate, for example, the near-field thermal probe and magnetic writing and recording heads over the same physical areas.

As with the inventive apparatus 200 illustrated in FIG. 2A, the inventive apparatus 700 may include a heat source controller for controlling the intensity of the thermal wave generated by the heat source 210. Further, the inventive apparatus 700 may also include a controller for coordinating mutual positioning of the incident thermal wave generated by the heat source 710 and the recording medium 720 so as to thermally couple the heat source 710 and the recording medium 720. Such a controller may be, for example, the same controller which controls the position of the read/write head assembly 725, for example, during a read/write operation.

More specifically, in this embodiment the heat source 710 may be fabricated using thin film techniques as a part of the slider 730 which contains the existing read/write element. In order to avoid the magnetoresistive read/write element being damaged from excessive temperature rise from the heat source 710, a resistive heater element should be made from a thin film of material with low thermal conductivity (typically around 1 to 2 w/mK DLC or 80/20 Ni/Cr) and then surrounded by an insulating material with a thermal conductivity which is 10 times higher (e.g., alumina). Such a design would help localize the temperature increase to the heater region of the slider thereby avoiding damage to the read/write element.

In addition, it should be noted that patterning recording media using this embodiment of the inventive apparatus 700 requires no additional processing steps regarding the storage layer architecture, or post-processing setups such as wet or dry etching cycles. Consequently, patterning the recording medium 720 using the inventive apparatus 700 results in no topological changes in the recording medium 720 that could interfere with low read/write head flyability requirements. It should also be noted that the lateral spreading of the heat on the recording medium 720 surface is negligible because the heater only dwells at a given area on the rotating disk for a time typically less than about 1 ns.

Furthermore, referring again to FIG. 2B, the present invention may include a recording medium 220 which is patterned by selective thermal coupling. As shown in the FIG. 2B, the inventive patterned recording medium 220 may include altered (e.g., altered chemical composition) areas 230 of and non-altered areas 240 according to a pattern (e.g., a predetermined pattern). The altered areas 230 and the non-altered areas 240 should have a different chemical composition as a result of the thermal coupling step discussed with respect to the inventive method 100 above. Note that, as mentioned above, the profile of the altered areas depends, for example, upon the profile of heater. For example, as shown in FIG. 2B, the heat source 210 may have a circular profile which would result in a circular profile of the altered areas 230, or the heat source 210 may have a profile other than circular (e.g., square, triangular, rectangular, etc.) which would affect the profile of the altered areas 230 accordingly.

More specifically, the patterned recording medium 220 may include, for example, a substrate as described in detail above, and a single layer of recording medium material, as described in detail above. In other words, the inventive patterned recording medium 220 does not require a storage layer structure as required by some conventional media and is, therefore, thinner than some conventional patterned recording media. In addition, the inventive method of patterning recording media leads to no topological changes so that the inventive patterned recording medium may have a surface that is substantially smooth. For example, the inventive patterned recording medium 220 does not have an island structure which is present in some conventional patterned media.

Further, the recording medium 220 may include a protective coating to protect the recording medium 220. The protective coating may be formed, for example, of a plastic material which is uniformly applied over the surface of the recording medium 220.

In addition, the present invention may include a programmable storage medium tangibly embodying a program of machine-readable instructions executable by a digital processing apparatus to perform the inventive method 100 as explained above.

Thus, the present invention provides a simple, versatile method for manufacturing patterned recording media which requires no lithographic masks or additional processing steps, an inventive patterned recording medium which is thin and substantially smooth to better facilitate a read/write operation, and an apparatus for patterning recording medium which is simple and inexpensive and may be incorporated into a conventional read/write assembly with little alteration of the read/write assembly.

While the invention has been described in terms of preferred embodiments, those skilled in the art will recognize that the invention can be practiced with modification within the spirit and scope of the appended claims.

What is claimed is:

1. An apparatus for patterning multiple areas on a disk, comprising: an energy source for generating and directing energy to a disk, said energy altering a composition of the disk; and a controller for coordinating a mutual position of said energy and said disk so as to couple said energy source and said disk, and wherein said energy altering the composition of the disk generally alters an area of less than 20 nm$^2$.

2. The apparatus according to claim 1, wherein said energy source comprises a tip for concentrating and directing energy.

3. The apparatus according to claim 1, further comprising: an optical waveguide coupled to said apparatus, for carrying a focused laser beam.

4. The apparatus according to claim 3, wherein said optical waveguide comprises an optical fiber.

5. The apparatus according to claim 4, wherein said optical waveguide comprises a planar optical waveguide.

6. The apparatus according to claim 1, wherein said energy source comprises an atomic force microscope probe.

7. The apparatus according to claim 1, wherein said energy source comprises one of a nanoheater and a near-field thermal probe.

8. A read/write head assembly, comprising: a read/write head; an energy source connected to said read/write head for generating and directing energy to a disk, said energy altering a composition of a disk; and a controller for coordinating a mutual position of said energy and said disk so as to couple said energy source and said disk, and wherein said energy altering the composition of the disk generally alters an area of less than a 20 nm$^2$.

9. The read/write head assembly according to claim 8, wherein said energy source comprises one of a nanoheater and a near field thermal probe.

10. The read/write head assembly according to claim 8, wherein said composition is altered according to a predetermined pattern, and wherein said energy source patterns said disk during a read/write operation of said read/write head assembly.

* * * * *